United States Patent [19]
Tanaka

[11] Patent Number: 4,494,862
[45] Date of Patent: Jan. 22, 1985

[54] COMPUTERIZED INFORMATION PROCESSING SYSTEM EQUIPPED WITH COPYING APPARATUS

[75] Inventor: Atsuyuki Tanaka, Shinshiro, Japan

[73] Assignee: Minolta Camera Kabushiki Kaisha, Osaka, Japan

[21] Appl. No.: 306,408

[22] Filed: Sep. 28, 1981

[30] Foreign Application Priority Data

Sep. 30, 1980 [JP] Japan .................. 55-136935
Jul. 31, 1981 [JP] Japan .................. 56-121528

[51] Int. Cl.³ .......................... G03G 15/04
[52] U.S. Cl. .................. 355/14 C; 355/3 R; 355/40
[58] Field of Search ............ 355/3 R, 14 R, 14 C, 355/40, 41

[56] References Cited

U.S. PATENT DOCUMENTS 4,026,642 5/1977 Tanaka et al. .......... 355/3 R X
4,179,212 12/1979 Lahr .................. 355/3 R X
4,251,152 2/1981 Miyakawa ............ 355/3 R
4,322,157 3/1982 Miura et al. .......... 355/14 C Primary Examiner—Fred L. Braun
Attorney, Agent, or Firm—Jackson, Jones & Price

[57] ABSTRACT

A computerized information-processing system including a copying machine operatively associated with a computer having a data storage apparatus having a plurality of memory locations wherein the copying apparatus is capable of reading a coded pattern on an original placed on the copying machine and for generating an instruction input to the computer for reading data from selected memory locations, and apparatus, responsive to data received from the computer from the memory locations, for imprinting, at preselected locations on copying paper passing through the copying machine, information represented by such data to correspond to locations on the original sheet as it is being copied on the copying paper. In addition the copying machine has a sensor for reading markings placed on the copy containing the copy of the original and the imprinted data for producing instructions to the computer to modify selected data in selected memory locations.

10 Claims, 25 Drawing Figures

COMPUTERIZED INFORMATION PROCESSING SYSTEM EQUIPPED WITH COPYING APPARATUS

BACKGROUND OF THE INVENTION

The present invention generally relates to a computerized information processing system and more particularly, to a computerized information processing system equipped with an intelligent copier having input and output functions for a computer.

Conventionally, it has been generally arranged that input to computers for information processing is effected through keying or mark sensed cards. However, in the above-described input method by keying, qualified key operators have been required for keying of all instruction data for processing, which keying is a much complicated operation.

Meanwhile, in the input method by mark sensed cards, such mark sensed cards have been required to be prepared for each job to be processed, which is also extremely troublesome. Furthermore, a large number of mark sensed cards have been required to be processed for data processing, which is also an extremely complicated operation.

Meanwhile, there have been known a cathode ray tube (CRT) display, a paper tape punch, a card punch, etc. as output devices from computers, and a line printer or a X-Y plotter has been used to record data on paper. However, in the line printer and X-Y plotter, there have been such an inconvenience that data printed out by them are difficult to read, since they are arranged to print out only data from computers.

Although the above-described devices are capable of drawing tabular lines, etc. functionally, the printout data have been so far used as they are in spite of the difficulty in reading, since processing for drawing tabular lines, etc. takes a very long time and requires complicated programs.

Furthermore, conventional computers has such a disadvantage that due to complicated operations of the input and output terminals, a special operator therefor is required to be provided, or respective users of the computers must learn the operation so as to be versed therein. Especially, it has been substantially impossible for non-experts to perform such operations as editing and changing of the output data, etc.

Meanwhile, many jobs to be processed by computers can be determined in routine for processing and unified in printout form.

SUMMARY OF THE INVENTION

Accordingly, an essential object of the present invention is to provide an improved computerized information processing system equipped with a copying apparatus, which is fairly easy in operation through simplified operations of a computer with respect to such routine jobs.

Another important object of the present invention is to provide an improved computerized information processing system equipped with a copying apparatus, in which data stored in a computer can be so copied on a legible form as to coincide therewith and the information on the form can be obtained on copy paper directly from a form original without using the computer.

A still another important object of the present invention is to provide an improved computerized information processing system equipped with a copying apparatus as described above, in which any desired data can be selected and edited by providing marks on cards and the like or corrected information can be obtained as a copy, whereby even those who are not versed in operations of computers can edit and correct, for output, data stored in the computer through ordinary processings of cards.

In accomplishing these and other objects according to one preferred embodiment of the present invention, there is provided an improved computerized information processing system equipped with a copying apparatus, which comprises the steps of imparting to the copying apparatus, functions for recording by forming an image on recording paper in response to an image signal supplied from a computer, reading marks provided on the recording paper, and supplying to the computer signals corresponding to predetermined processing instructions besides normal copying function thereof, connecting the copying apparatus with the computer through a circuit, processing, for output, information stored in the computer by a read signal and an instruction signal from the copying apparatus and recording the processed output signal on the recording paper through the recording function of the copying apparatus.

BRIEF DESCRIPTION OF THE DRAWINGS

These and other objects of the present invention will become more apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

The present invention will be described by way of example with reference to the accompanying drawings, hereinbelow.

It is to be noted that a copying apparatus for use in a computerized information processing system of the present invention is of a transfer type of electrostatic latent images.

In copying apparatus having an overlay function of producing a copy by overlaying an image of an original with data obtained from a computer, etc., the abovedescribed transfer type of electrostatic latent images is more advantageous in compactness of the apparatus than a transfer type of toner images, for example, disclosed in U.S. Pat. No. 4,251,152. Namely, since in the transfer type of toner images, plain paper sheets are used, the overlay of the data must be performed on a photoreceptor at all times, so that an overlay device is required to be disposed adjacent to the photoreceptor, thus resulting in a larger apparatus in size undesirably.

Meanwhile, since in the transfer type of electrostatic latent images, insulating paper sheets are used, it is possible to form a latent image of the overlay data on the insulating paper sheet separately from the photoreceptor and overlap said latent image with a latent image on the photoreceptor, thereby resulting in a compact apparatus. However, it is needless to say that a copying apparatus of the toner image transfer type can be applied to the computerized information processing system of the present invention.

Figure 1:
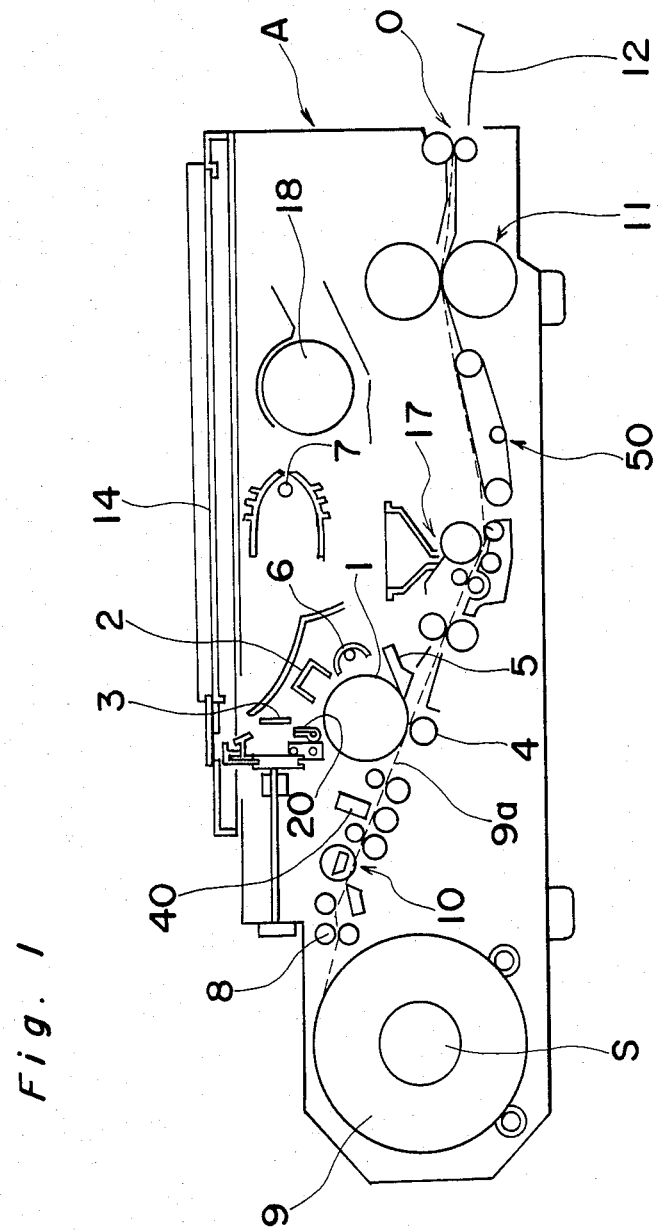
FIG. 1 is a cross-sectional view of a copying apparatus for use in a computerized information system of the present invention.

Referring now to the drawings, there is shown in FIG. 1 a copying apparatus for use in the computerized information processing system of the present invention.

The copying apparatus generally includes an original platform 14 movable with respect to a copying apparatus housing A and a photoreceptor drum 1 which is rotatably mounted at approximately a central portion of the copying apparatus housing A for rotation in the counterclockwise direction, and around which a corona charger 2, an optical system 3 composed of a Selfoc (name used in trade) lens array, that is, an image transmitter formed of a plurality of graded index fibers in bundled configuration, a transfer roller 4, a separator 5, an eraser lamp 6, etc. are sequentially disposed along the circumference of the photoreceptor drum 1 in a known manner so as to successively process the surface of the drum 1 as the photoreceptor drum 1 rotates. An original placed on the original platform 14 is irradiated by a photoreceptor lamp 7, in response to the movement of the original platform 14, on the photoreceptor of the photoreceptor drum 1 which was subjected to corona charging by the corona charger 2 so as to form an electrostatic latent image.

Meanwhile, at the left portion of the copying apparatus, there is rotatably provided a shaft S on which copy paper 9 made of insulating paper for forming electrostatic latent images is stored in a roll form, while along a path of the copy paper 9 shown in a broken line, a pair of paper feeding rollers 8, a cutter 10 composed of a rotary cutter, the transfer roller 4, the separator 5, a developing device 17, a transport device 50, a fixing device 11 composed of a pair of known pressure rollers and an outlet opening O are sequentially disposed.

The copy paper 9 which is drawn out from the shaft S by the rotation of the paper feeding rollers 8 driven synchronously with the forming of the electrostatic latent images is cut to a predetermined size by the cutter 10 so as to be further fed to the transfer roller 4 where the electrostatic latent image on the surface of the photoreceptor drum 1 is transferred to the copy paper 9. Then, the copy paper 9 is separated from the photoreceptor drum 1 by the separator 5 and further fed to the developing device 17 so as to be developed. The copy paper 9 thus developed is further fed to the fixing device 11 through the transport device 50 so as to be fixed and ejected out of the copying apparatus into a copy receiving tray 12 through the outlet opening O at the lower right portion of the copying apparatus, whereby a copying cycle is completed.

Meanwhile, the photoreceptor drum 1 which has passed through the transfer roller 4 is subjected to charge erasing by the eraser lamp 6 and then, the abovedescribed operations are repeated. A cooling fan 18 is provided at the right upper portion of the copying apparatus.

Then, a read arrangement of the copying apparatus for use in the system of the present invention will be described with reference to FIGS. 2 and 3, hereinbelow.

It is to be noted that the read arrangement acts as an input device for a computer.

Figure 2:
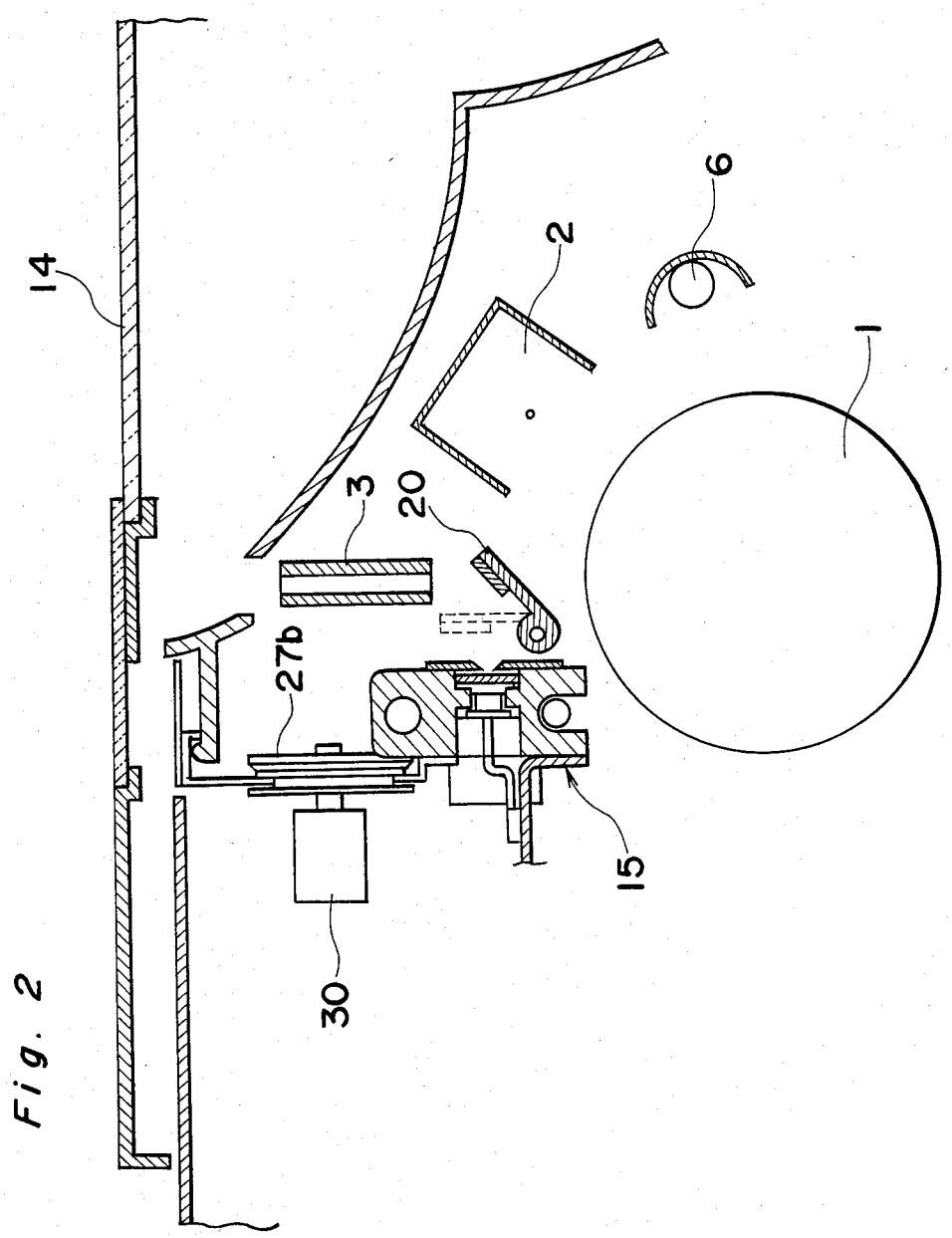
FIG. 2 is a cross-sectional view showing, on an enlarged scale, an essential portion of the copying apparatus of FIG. 1.

Although a light image of the original is directed towards the photoreceptor drum 1 through the optical system 3 during copy mode, a mirror 20 is disposed between the photoreceptor drum 1 and the optical system 3 slantways with respect to a line connecting the center of the photoreceptor drum 1 and the axis of the optical system 3 so that the light image of the original may be directed towards sensors 15 during read mode, as shown in FIG. 2. The mirror 20 is pivotally disposed, by a solenoid (not shown), for movement between positions shown in solid lines and broken lines during the read mode and copy mode, respectively.

Figure 3:
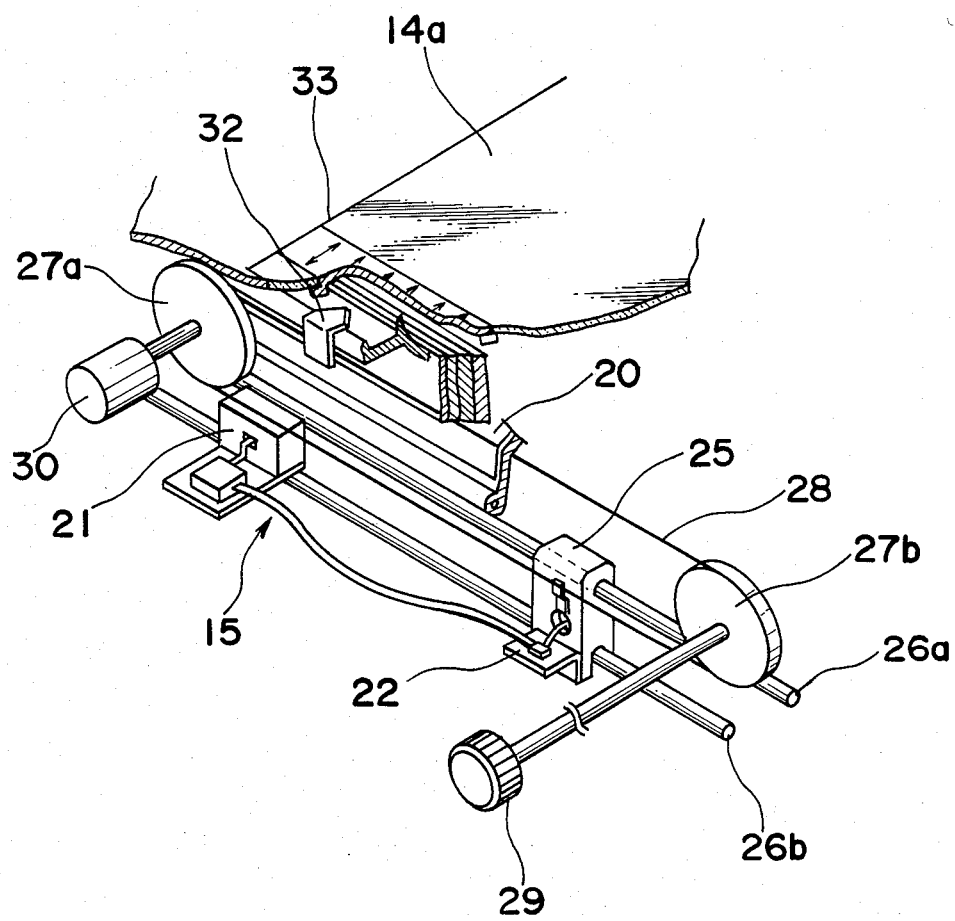
FIG. 3 is a partial perspective view showing, on an enlarged scale, a bar code sensor and a color code sensor employed in the copying apparatus of FIG. 1.

The sensors 15 comprise a bar code sensor 21 which is fixed to a position corresponding to bar codes printed on the original and a color mark sensor 22 which is slidably mounted on two guide rods 26a and 26b in parallel with the axis of the photoreceptor drum 1, as shown in FIG. 3.

The color mark sensor 22 includes a slider 25, a photo detector contained in the slider 25, a color filter (not shown) and a slit member (not shown), both of which are disposed in front of the photo detector.

The slider 25 is supported by the two guide rods 26a and 26b so as to be slidably guided in parallel with the axis of the photoreceptor drum 1 and is disposed approximately below a lower portion of a wire 28 laid between a pulley 27a and a pulley 27b. A shaft for the pulley 27b is provided with a dial 29 projecting out of the copying apparatus so that the color mark sensor 22 can be changed in position by manually rotating the pulley 27b. On the other hand, a shaft for the pulley 27a is provided with a rotary encoder 30 for detecting a position of the color mark sensor 22 by rotational angle of the pulley 27a.

A pointer 32 is fixed to an upper portion of the wire 28 between the pulleys 27a and 27b and is so guided by a support portion at the rear side of the mirror 20 as to be moved in directions opposite to those of the color mark sensor 22 when the dial 29 is rotated. It is so arranged that the pointer 32 is visible through a transparent plate 33 provided on a frame of the original platform 14. The original is placed face-up on a glass 14a of the original platform and then, the dial 29 is rotated so that marked portions of the original to be described later may coincide with the pointer 32 in a direction of motion of the original platform 14. Then, when the original is placed face-down on the glass 14a of the original platform 14, for copying, the marked portions of the original are accurately aligned with the color mark sensor 22.

Meanwhile, a needle electrode 40 provided with styluses is disposed at the face side of the copy paper 9a between the cutter 10 and the transfer roller 4, as shown in FIG. 1. The styluses are provided laterally at 8 to 12 locations per mm in a line. A specific stylus is actuated by a corresponding signal from the computer so that insulating paper may be provided with electric charge.

Figure 4:
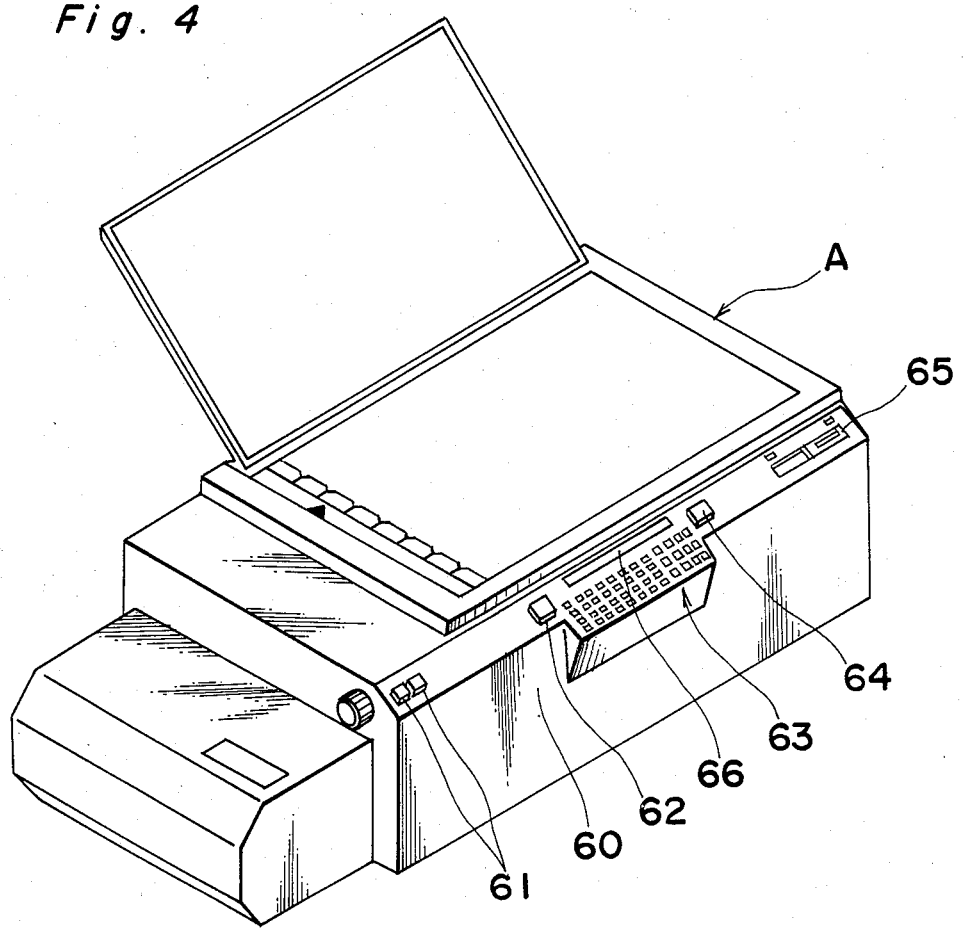
FIG. 4 is a perspective view of the copying apparatus of FIG. 1.
Figure 5:
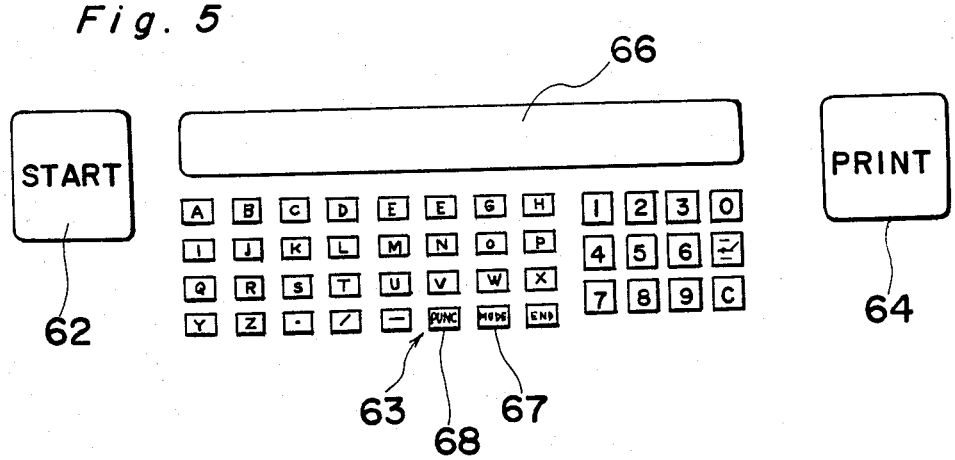
FIG. 5 is a top plan view of a keyboard employed in the copying apparatus of FIG. 4.

As shown in FIGS. 4 and 5, power source ON and OFF switches 61, a read start switch (start switch) 62, a keyboard 63, a display panel 66, a print switch 64, and an exposure amount adjusting knob 65 are disposed sequentially in this order from the left side to the right side of an operating panel 60 provided at a front side wall of the copying apparatus housing A.

When the start switch 62 for starting read mode is turned ON, the mirror 20 is moved to the position shown by solid lines in FIG. 2, and the original platform 14 and a lighting system is so actuated as to scan the original, whereby the information of the original is read by the bar code sensor 21 and the color mark sensor 22.

The keyboard 63 is used not only for setting number of copies to be taken during automatic copying when the copying apparatus acts as an ordinary one, etc., but for calling the external computer and designating a desired data file number in a memory bank of the external computer when the copying apparatus is used in connection with the external computer. The call of the external computer is effected through a telephone circuit, provision of specific call keys, read of a paper sheet on which specific bar codes are printed or keying of a specific combination of numerals.

The display panel 66 is used not only for displaying the number of copies to be taken, such indications as jam, empty toner, empty paper, call serviceman, etc. when the copying apparatus acts as an ordinary one but for displaying information given through the keyboard 63 (designated number of a data file in the memory bank, etc.), processing modes (standby, read mode, overlay mode, printout mode, copy mode), or added or corrected data to be keyed when the copying apparatus is used in connection with the external computer.

Figure 6:
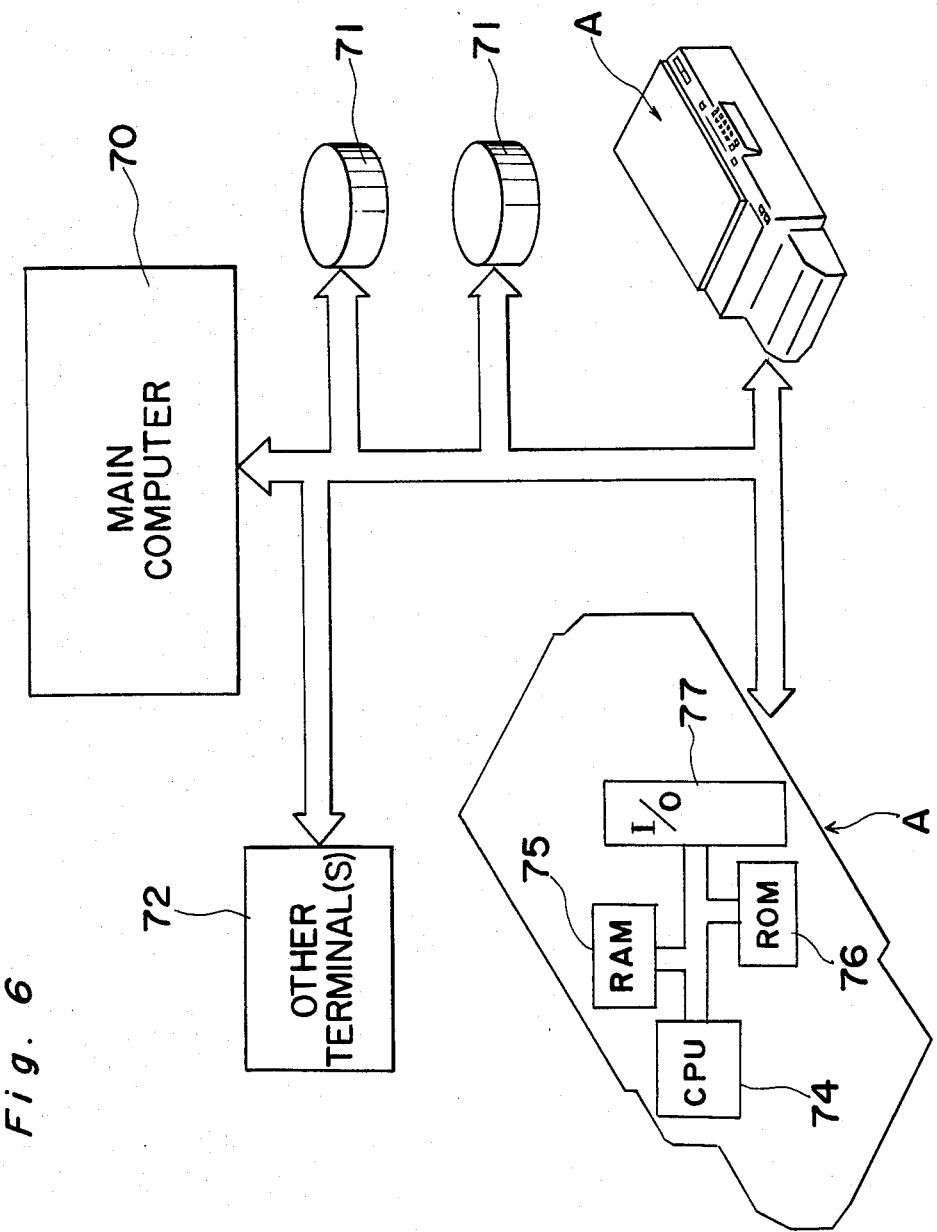
FIG. 6 is a block diagram explanatory of the computerized information processing system of the present invention.

The copying apparatus for use in the computerized information processing system of the present invention is so arranged as described above and is connected with a main computer 70, as shown in FIG. 6. The copying apparatus has four operational modes of copy, printout, overlay and read as shown in FIG. 7.

One example of the processing sequences of operations of the copying apparatus will be described with reference to flow charts of FIGS. 7 to 11, hereinbelow.

Figure 7:
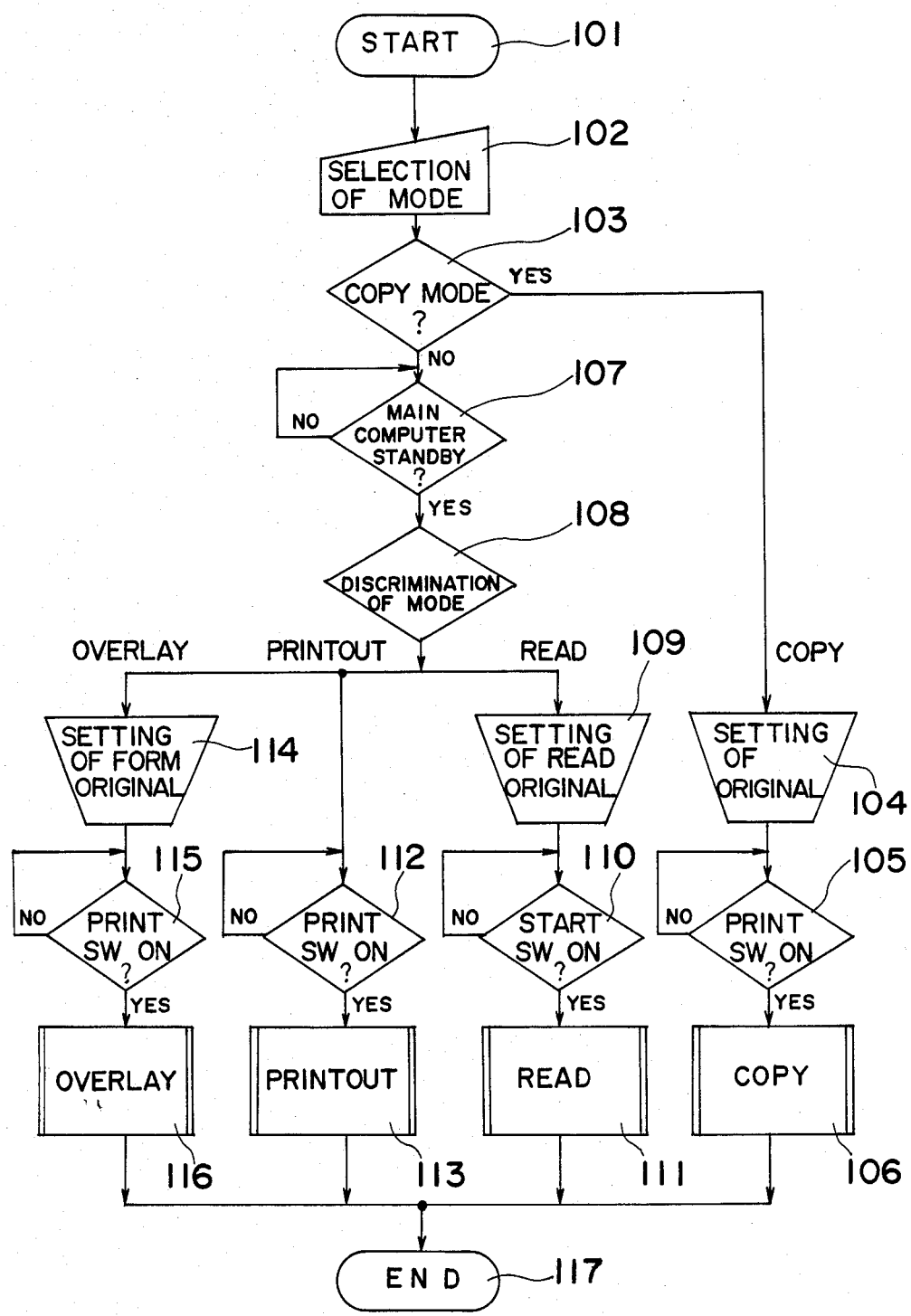
FIGS. 7 to 11 are flow charts showing processing sequences of operations of the copying apparatus of FIG. 4.

Referring to FIG. 7, a mode is selected at a step 102 following a step 101 for start. At a step 103, a decision is made as to whether or not the copying apparatus is in the copy mode. In the case of "YES", an original is placed on the original platform 14 at a step 104. Then, if it is found at a step 105 that the print switch 64 is turned ON, copying is performed at a step 106 followed by a step 117 for end. In the case of "NO" at the step 103, if it is found at a step 107 that the main computer is on standby, the main computer discriminates among overlay, printout and read modes so as to select one of them at a step 108.

In the case of the printout mode, if it is found at a step 112 that the print switch 64 is turned ON, printing is performed at a step 113 followed by the step 117 for end.

In the case of the overlay mode, a form original is set at a step 114. Then, if it is found at a step 115 that the print switch 64 is turned on, overlaying is performed at a step 116 followed by the step 117 for end.

In the case of the read mode, a read original is set at a step 109. Then, if it is found at a step 110 that the start switch 62 is turned ON, reading is performed at a step 111 followed by the step 117 for end.

Now, the processing sequences of operations of the copying apparatus in the copy, printout, overlay and read modes will be described in more detail with reference to FIGS. 8, 9, 10 and 11, respectively, hereinbelow.

Figure 8:
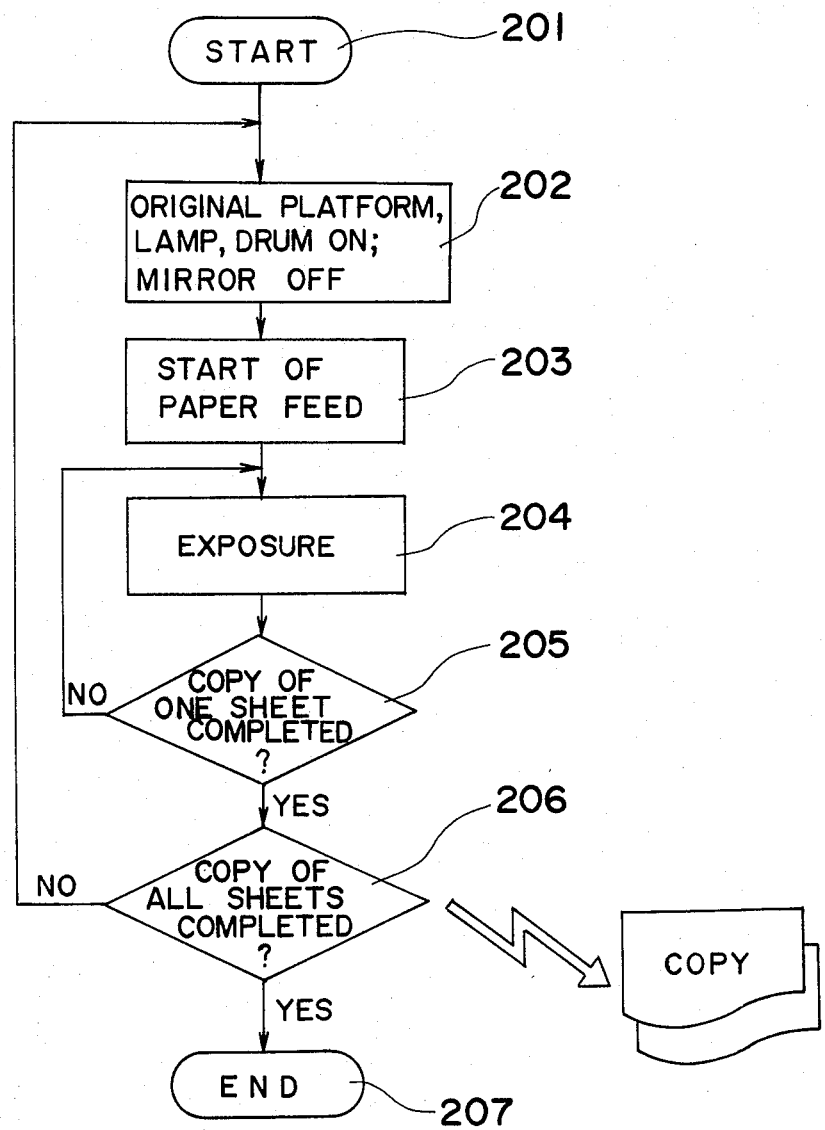

In the case of the copy mode, if the original is placed on the original platform 14 at the step 104 and it is found at the step 105 that the print switch 64 is turned ON as shown in FIG. 7, the original platform 14, photoreceptor lamp 7 and photoreceptor drum 1 are turned ON while the mirror 20 is disposed at the OFF position shown by broken lines in FIG. 2 at a step 202 following a step 201 for start, paper feed is started at a step 203 and the copy paper is subjected to exposure at a step 204 so as to perform copying one sheet by one sheet, as shown in FIG. 8. At a step 205, a decision is made as to whether or not one copy paper sheet has been copied. In the case of "YES", if it is found, at a step 206, that all copy paper sheets have been copied, a step 207 for end follows. In the case of "NO" at the step 205, the processing sequence is returned back to the step 204.

Figure 9:
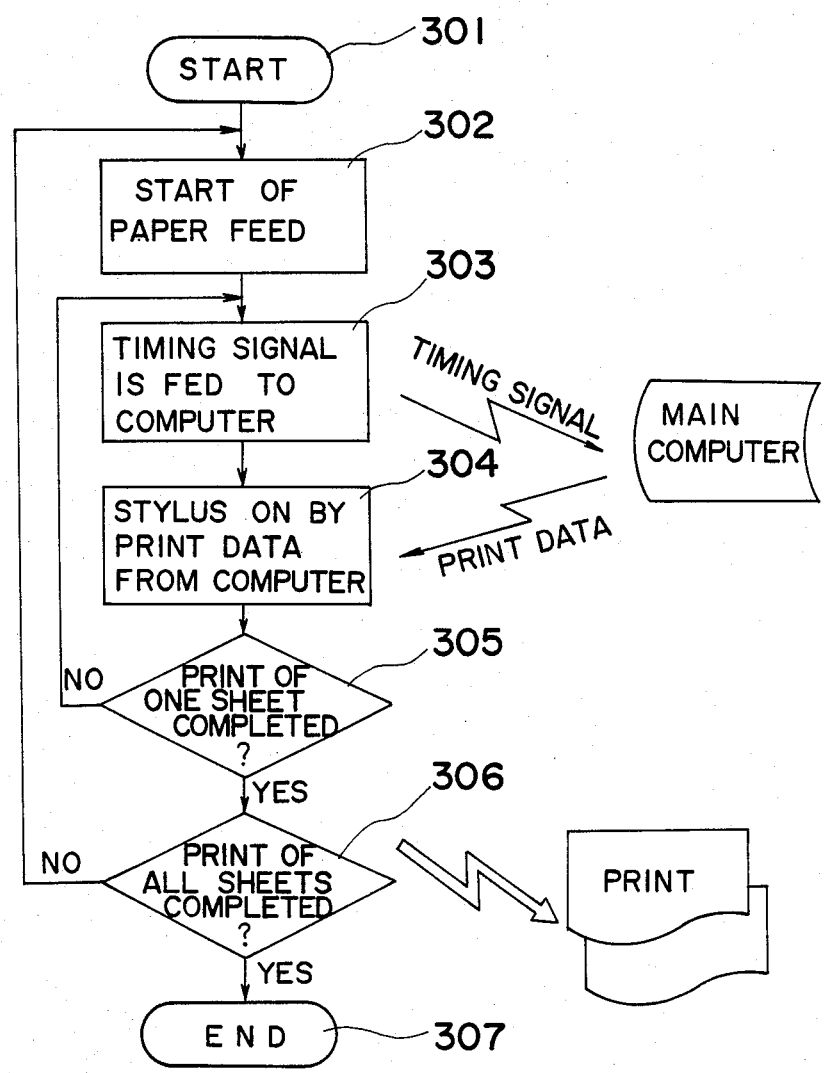

In the case of the printout mode, if it is found, at the step 112, that the print switch 64 is turned ON as shown in FIG. 7, paper feed is started at a step 302 following a step 301 for start, a timing signal is supplied to the main computer 70 at a step 303 and styluses are turned ON in accordance with print data from the computer 70 synchronously with the paper feed so as to print the data, as shown in FIG. 9. Then, at a step 305, a decision is made as to whether or not one copy paper sheet has been printed. In the case of "YES", if it is found, at a step 306, that all copy paper sheets have been printed, a step 307 for end follows. In the case of "NO" at the step 305, the processing sequence is returned back to the step 303.

Figure 10:
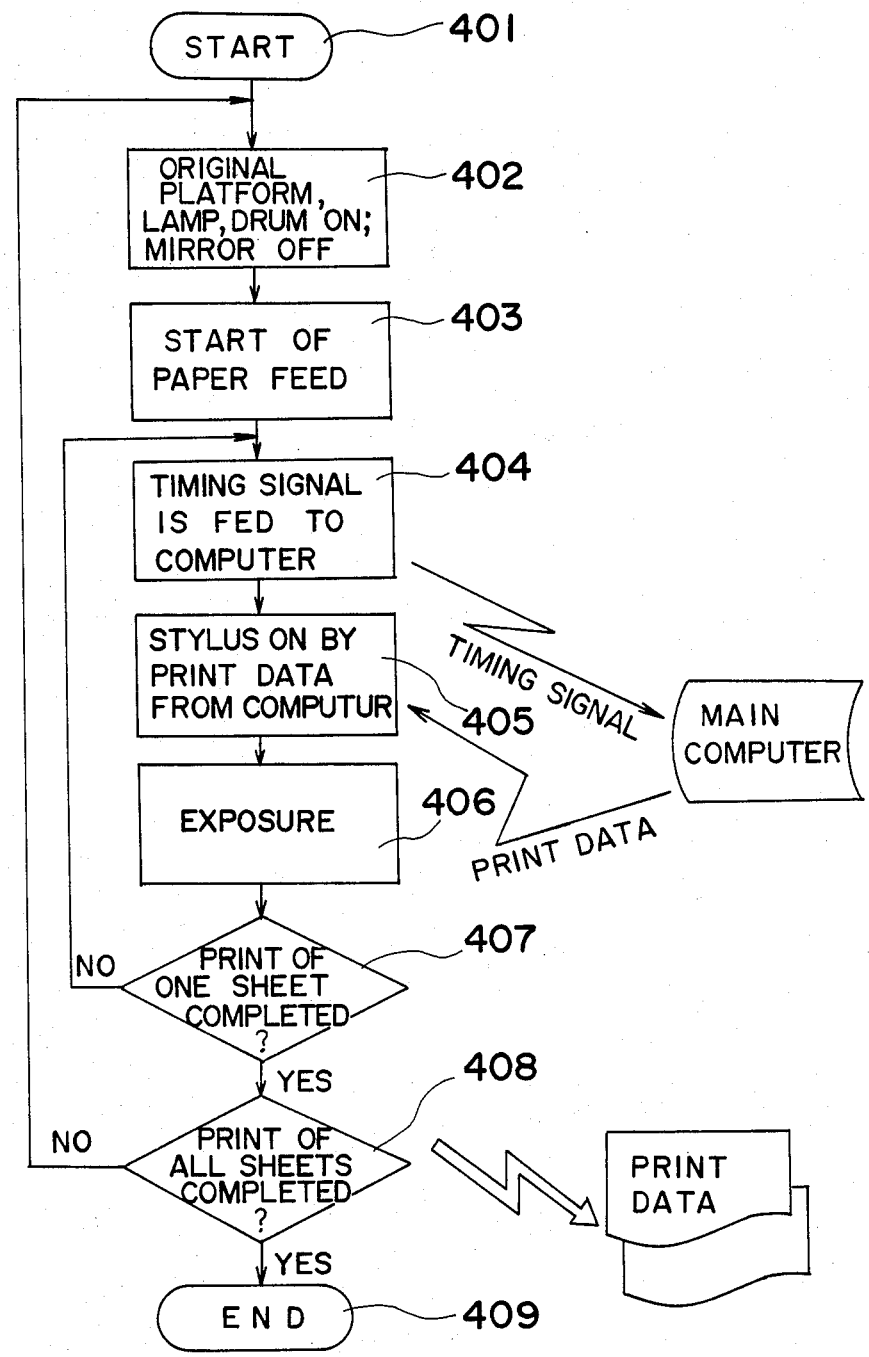

In the case of the overlay mode, if the form original is set at the step 114 and it is found, at the step 115, that the print switch 64 is turned ON as shown in FIG. 7, the original platform 14, photoreceptor lamp 7 and photoreceptor drum 1 are turned ON while the mirror 20 is disposed at the OFF position shown by broken lines in FIG. 2 at a step 402 following a step 401 for start, paper feed is started at a step 403, a timing signal is supplied to the main computer 70 at a step 404, styluses are turned ON in accordance with print data from the computer 70 synchronously with the paper feed so as to print the data at a step 405 and the copy paper is subjected to exposure at a step 406 so as to perform printing so that an image of the form original may be transferred onto the copy paper through the photoreceptor drum 1, as shown in FIG. 10. At a step 407, a decision is made as to whether or not one copy paper sheet has been printed. In the case of "YES", if it is found, at a step 408, that all copy paper sheets have been printed, a step 409 for end follows. In the case of "NO" at the step 407, the processing sequence is returned back to the step 404.

Figure 11:
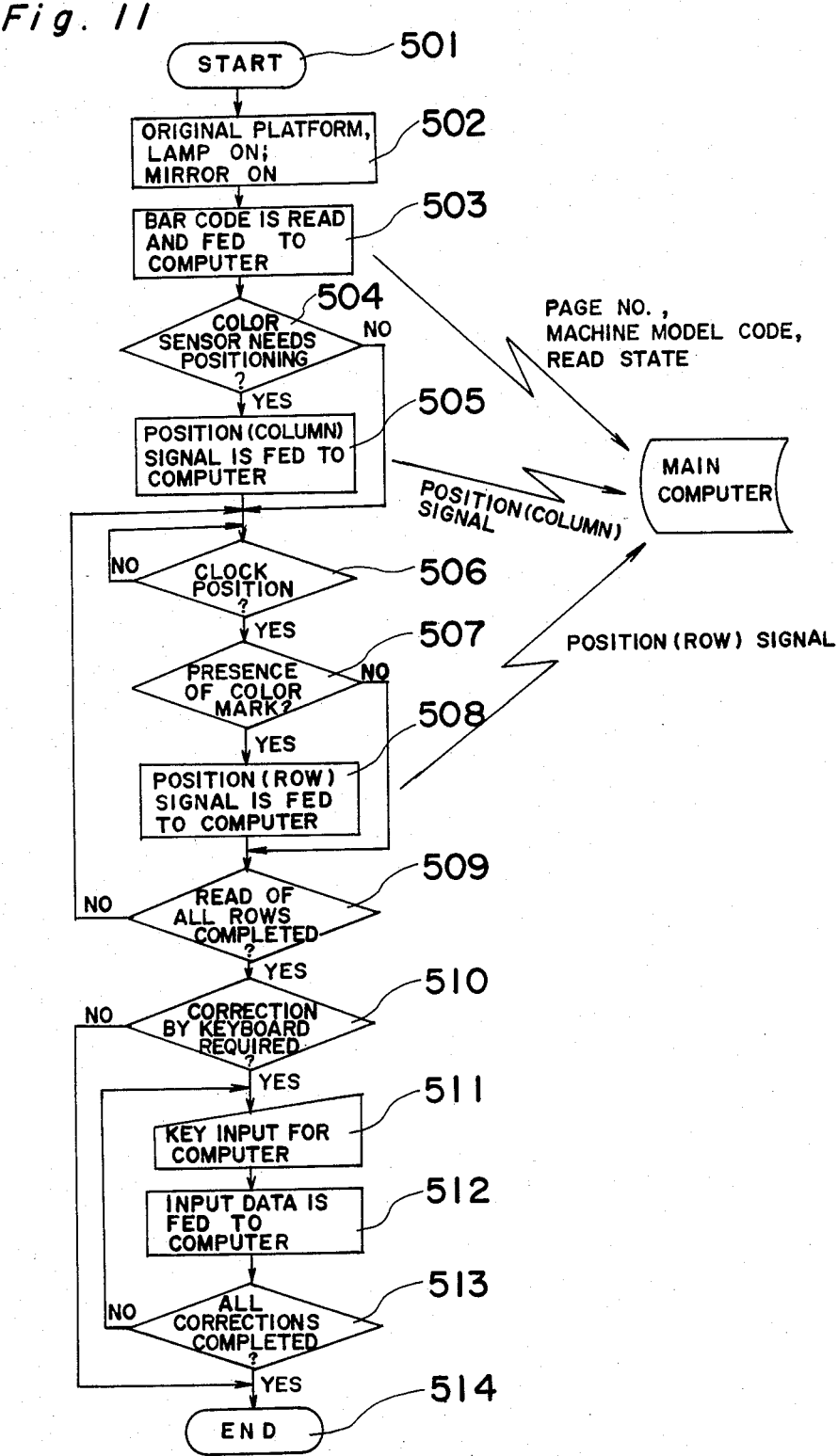

In the case of the read mode, if the read original is set at the step 109 and it is found at the step 110 that the start switch 62 is turned ON as shown in FIG. 7, the original platform 14, photoreceptor lamp 7 and photoreceptor drum 1 are turned ON while the mirror 20 is disposed at the ON position shown by solid lines in FIG. 2 at a step 502 following a step 501 for start, and bar codes marked on the original is read by the bar code sensor 21 and supplied to the main computer 70 at a step 503, as shown in FIG. 11. If it is found, at a step 504, that the color mark sensor 22 needs positioning, a column position signal of the color mark sensor 22 is supplied to the main computer 70 at a step 505. If it is found, at a step 506, that the column position of the color mark sensor 22 is a clock position to be detected by the bar code sensor 21, a decision is made as to whether or not color marks are present at a step 507. In the case of "YES", a row position signal is supplied to the main computer 70 at a step 508. In the case of "NO", a step 509 follows. If it is found, at a step 509, that all rows have been read, a decision is made as to whether or not correction is required through the keyboard 63 at a step 510. In the case of "YES", corrected data is supplied to the copying apparatus by keying at a step 511 and the input data is further fed to the main computer 70 at a step 512. In the case of "NO", a step 514 for end follows. If it is found at a step 513 that all corrections have been completed, the step 514 for end follows.

Then, a structure of the computerized information system equipped with a copying apparatus of the present invention will be described with reference to FIG. 6, hereinbelow. The copying apparatus as described above is provided at each section concerned and each copying apparatus is connected with the main computer 70. The main computer 70 is connected with memory banks 71 and other terminals 72. Each copying apparatus contains a CPU 74, a RAM 75, a ROM 76, and an I/O port 77 therein so as to control operations of the copying apparatus in respective modes, transmit read information, receive information from the computer 70, etc.

Meanwhile, each copying apparatus may be connected with the main computer 70 by a modem (modulator/demodulator through telephone circuit).

Then, a processing sequence of a job by the computerized information processing system according to a first embodiment of the present invention will be described with reference to FIGS. 12 to 14(b), hereinbelow.

Figure 12:
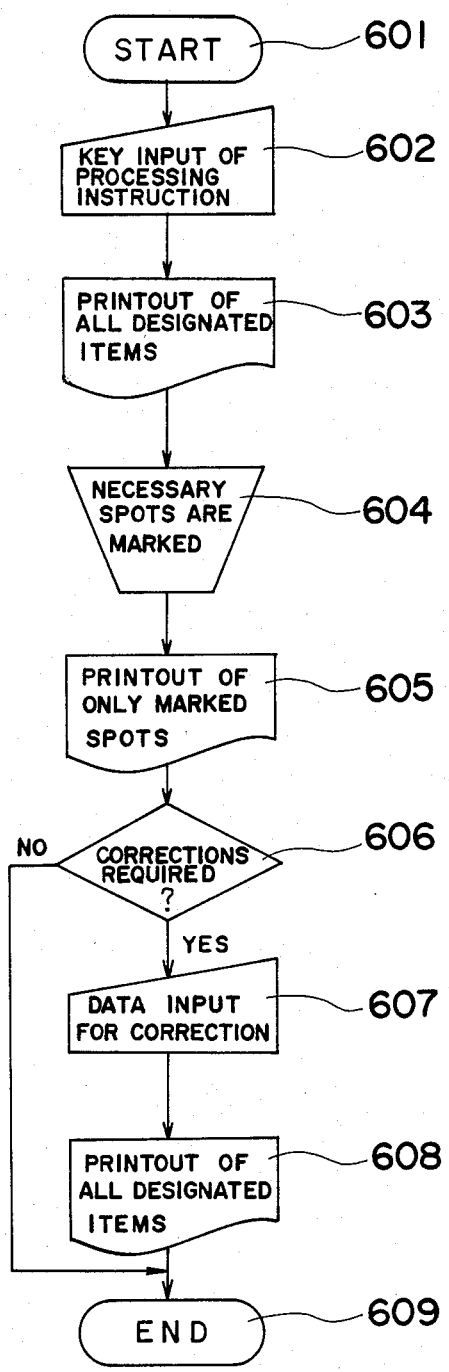
FIG. 12 is a flow chart showing a processing sequence of a job by the computerized information processing system according to a first embodiment of the present invention.

As show in FIG. 12, at a step 602 following a step 601 for start, a processing instruction for printout of all data is supplied to the copying apparatus through keying of the keyboard 63 so as to print out all designated items at a step 603. Then, instruction codes which have been preliminarily printed on bar code portions of a form original is overlaid with the printed data so as to form a first image. At a step 604, necessary spots of the first image is marked. Then, marks provided on the first image and the bar codes are read by the sensor 15 so as to transmit the mark signal and bar code signal to the computer 70 while only the marked spots are printed out through operation of the copying apparatus so as to form a second image at a step 605. If it is found at a step 606 that the second image requires corrections, corrected data are supplied to the copying apparatus through keying of the keyboard 63 at a step 607 and all designated items are again printed out so as to form a third image at a step 608 followed by a step 609 for end. The third image can be further corrected.

Figure 13A:
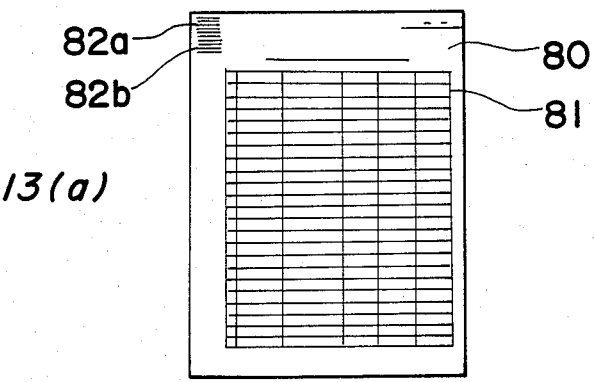
FIGS. 13(a) to 13(h) are top plan views showing form originals and methods of marking on the originals employed in the computerized processing system of FIG. 12, FIGS. 14(a) and 14(b) are flow charts particularly showing the flow chart of FIG. 12 in more detail.
Figure 13B:
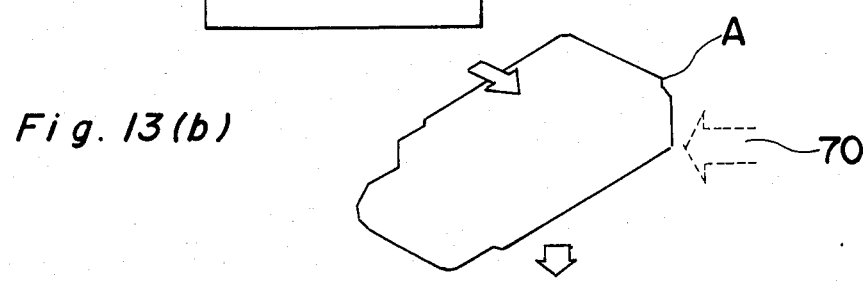
Figure 13C:
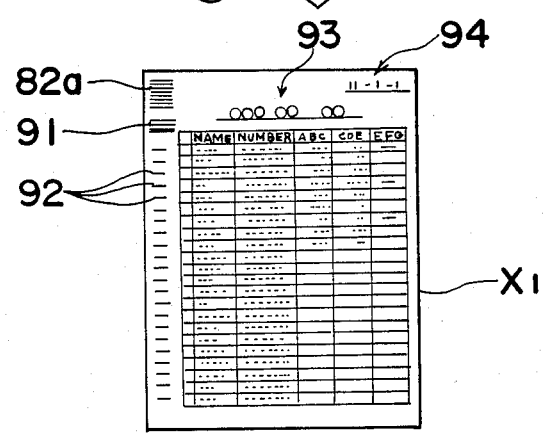
Figure 13D:
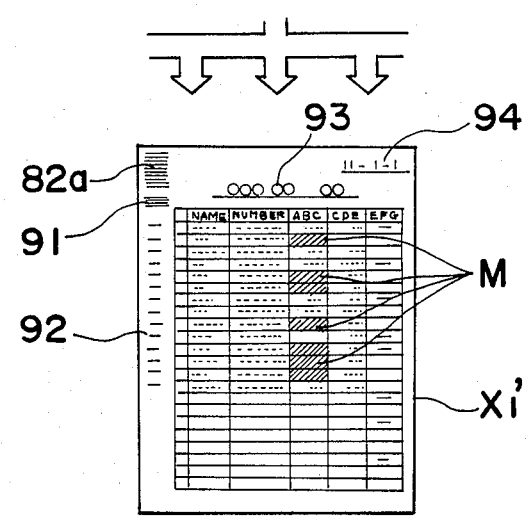
Figure 13E:
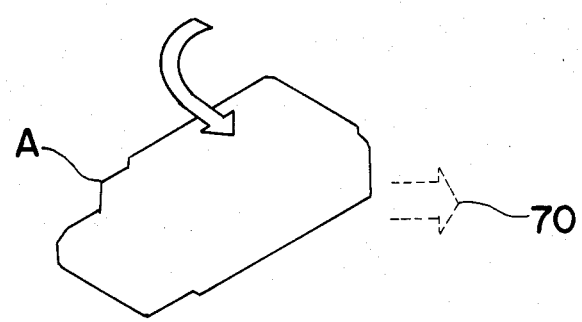
Figure 13F:
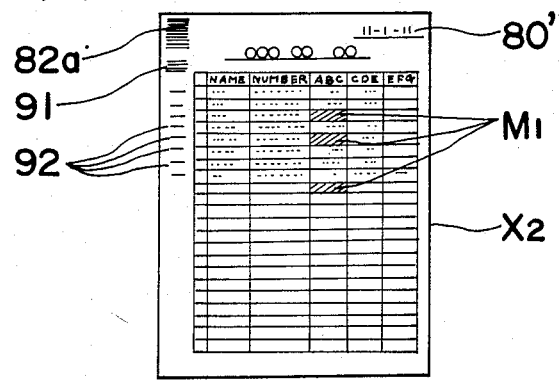
Figure 13G:
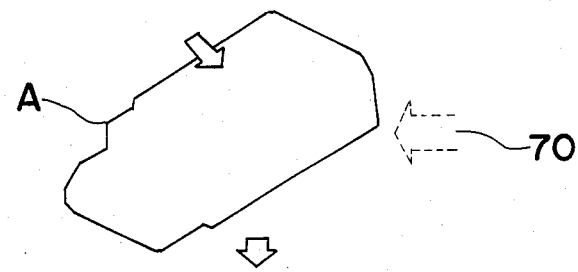
Figure 13H:
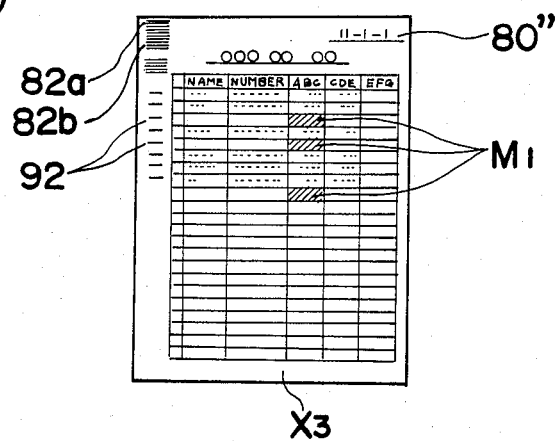
Figure 14A:
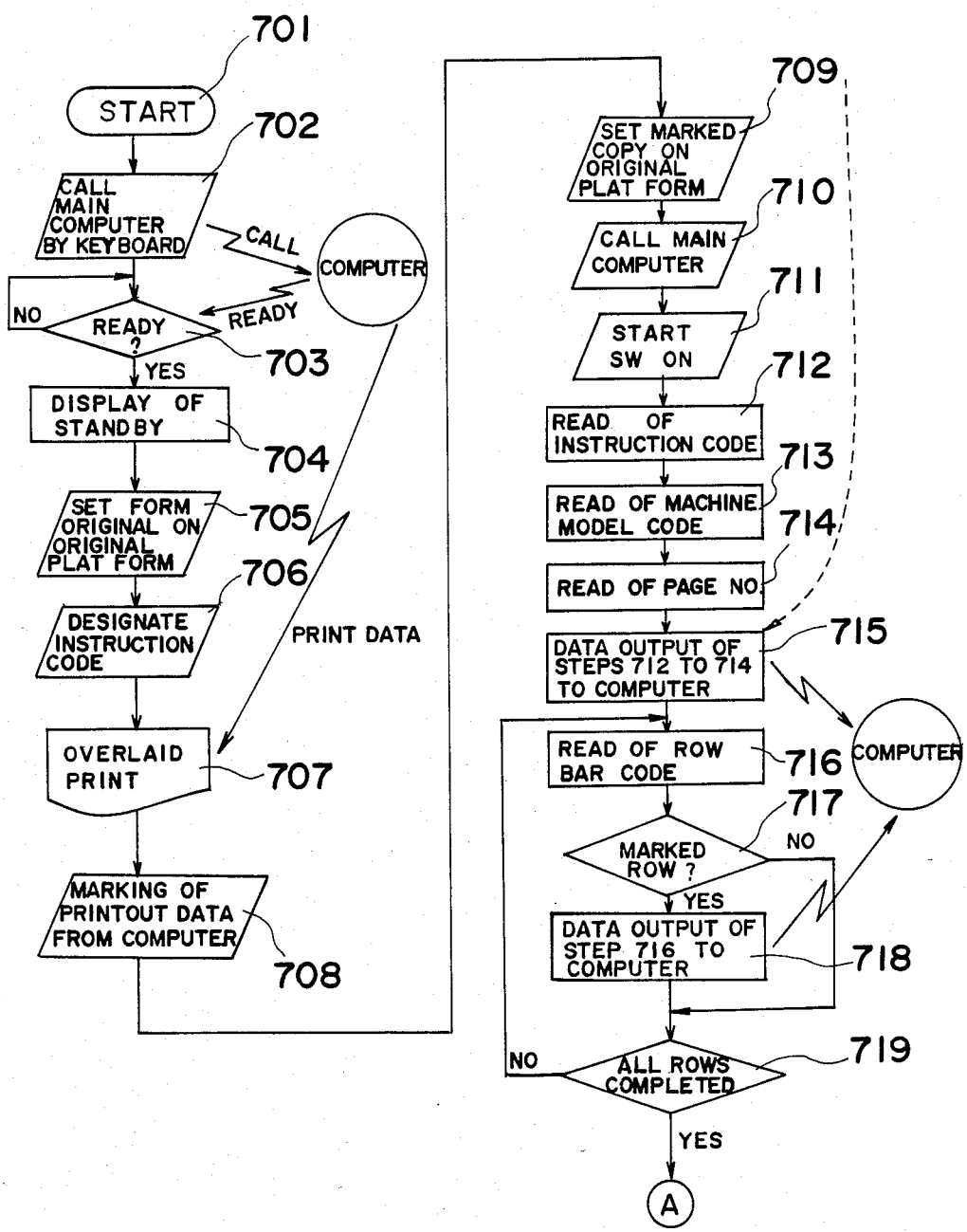
Figure 14B:
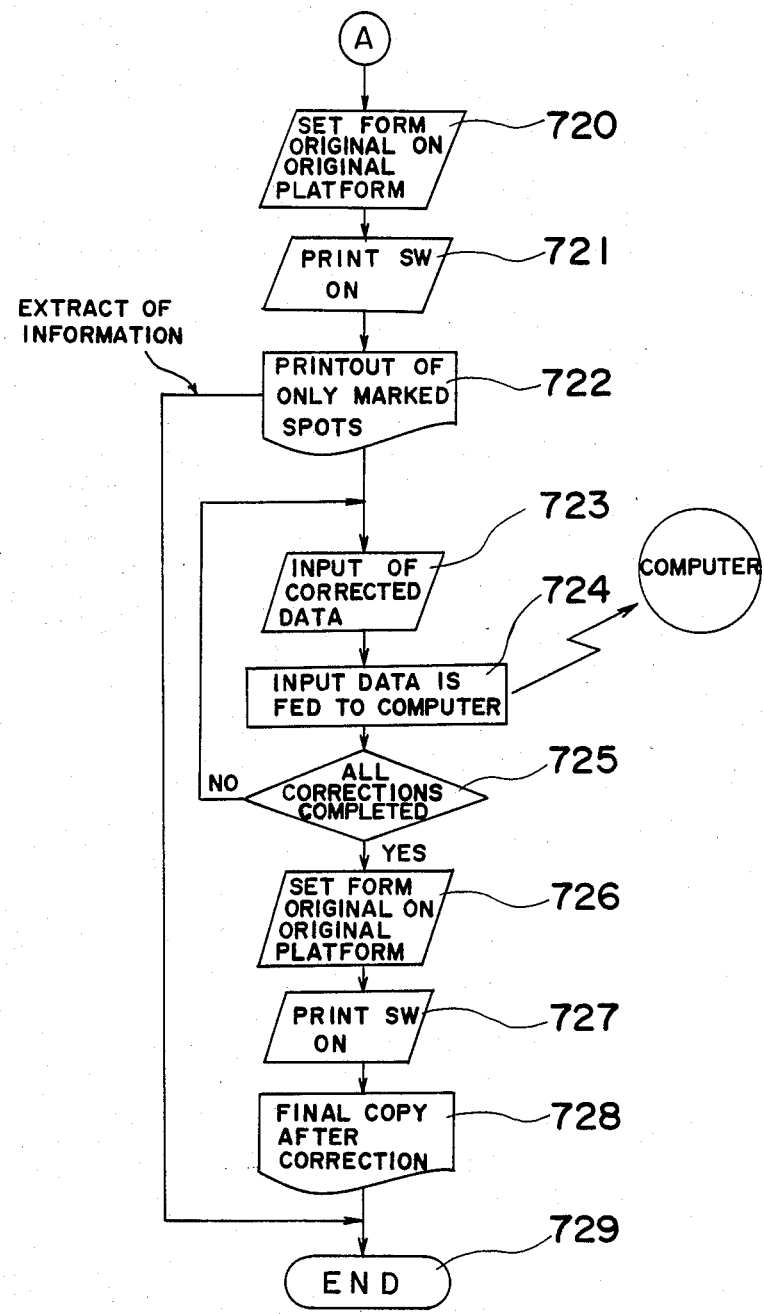

More detailed flow charts of FIG. 12 are given in FIGS. 14(a) and 14(b). Data processing of parts control at a factory will be described with reference to FIGS. 13(a) to 13(h), hereinbelow, as one specific example of a job to be processed in accordance with flow charts of FIGS. 14(a) and 14(b). Firstly, when a product is transferred for production thereof from a design department to the factory, a list of all necessary parts of the product is presented to the factory. The data of all parts are supplied to the main computer 70 and stored in memory banks 71. The data include items such as code numbers of parts, ordered suppliers, quantity per unit, total stock, etc.

In the printout mode, data of all parts of the product stored in the main computer 70 are printed out so that the data may be overlaid with a form 81 (tabular lines) shown in FIG. 13(a), as shown in FIG. 13(c).

Referring to FIG. 14(a), at a step 702 following a step 701 for start, the main computer 70 is called through the keyboard 63. If it is found that at a step 703 that the main computer 70 is in ready state, the word "Standby" is displayed at the display panel 66 so as to indicate waiting state for receiving input of instructions at a step 704, a first form original 80 is placed on the original platform 14 at a step 705 and a machine code of the product and an instruction code for printout of all data are supplied to the copying apparatus through keying of the keyboard 63 at a step 706.

Meanwhile, the tabular lines 81 for filling therein such data as parts codes, ordered suppliers, quantity, total stock, etc., reference bar codes 82a for providing a positional reference of the tabular lines 81, bar codes 82b for indicating an instruction for the subsequent processing, for example, for reading marked rows and printing out only the read rows in response to the subsequent printout signal have been preliminarily printed in position on the first form original 80.

Then, at a step 707, printout is performed on the first form original 80 in response to the abovedescribed instruction code supplied to the copying apparatus through keying of the keyboard 63 with the first form original 80 being overlaid with the data as shown in FIG. 13(c). Namely, an electrostatic latent image of the first form original 80 is formed on the photoreceptor drum 1 through the optical system 3 while data from the main computer 70 are produced at the needle electrode 40 synchronously with forming of the image of the first form original 80 so as to be disposed in position on the first form original 80 so that an electrostatic latent image of the data may be formed on the copy paper 9a. Then, the electrostatic latent image of the first form original 80 on the photoreceptor drum 1 is overlaid with the electrostatic latent image of the data on the copy paper 9a at the transfer roller 4 and a first copy X1 is completed through known developing and fixing processes. The needle electrode 40 is so arranged as to print out, for example, the following data for the subsequent processings in addition to the data of parts.

I. Bar codes for indicating the machine model code of the product.

II. Bar codes 91 for indicating respective serial page numbers of all data, which are disposed below bar codes 82a and 82b.

III. Clock codes 92 which are so disposed below bar codes 82a and 82b as to be aligned with rows of data.

IV. Machine model name or machine model code number 93.

V. Data 94

The codes 91 and 92 are used for correcting the subsequent printout.

Meanwhile, a plurality of the first copies X1 are usually produced due to a great amount of data to be processed. In the case of a great amount of data, for example, a few pages of data, the copying apparatus may contain therein a memory for storing data transmitted from the main computer 70 so as to furnish the data sequentially in response to copying or a timing signal for copying process may be supplied to the main computer 70 so as to transmit the data synchronously with copying.

Referring back to FIG. 14(a), at a step 708, the first copy X1 of all data obtained in the printout mode is distributed to a person in charge so as to be checked by him as shown in FIG. 13(d). The check includes check of extract of necessary information, errors in marking and data, and changes in data. The extract of necessary data items is checked by, for example, sorting them according to ordered suppliers, special parts, common parts, machine units, etc. so as to mark spots required for extract. The check of errors in data and changes in data is performed to check errors in data stored in the main computer 70 and corresponding data when data of parts, quantity, ordered suppliers, etc., are changed, respectively. The above-described marking for check is performed by the use of commercially available color marker fluorescent pens. The colors of the fluorescent pens should correspond to filters so that the colors can be detected by the color mark sensor 22. The check is performed by marking marks M on necessary items of the first copy X1 by the use of color marker fluorescent pens, as shown in FIG. 13(d).

The first copy X1', provided with marks M for check is read by the system of the present invention. Meanwhile, the bar codes 82b include an instruction for reading marked rows and printing out only the read rows in response to the subsequent printout signal, as described above. Since the above-described instruction is designed only for editing, positioning of the color mark sensor 22 is not required, if all rows of one part are marked with fluorescent pens. In the case where partially, for example, only the part code is marked, positioning of the color mark sensor 22 is required. When information on positions of marks is required, the position of the pointer 32 is read by the rotary encoder 30 shown in FIGS. 2 and 3 so that the positional data may be supplied to the computer 70.

Referring back to FIG. 14(a), the first copy X1' provided with marks M for check is placed on the original platform 14 of the copying apparatus so as to be read by the system of the present invention at a step 709, the main computer 70 is called at a step 710, and the start switch 62 is turned ON at a step 711 so as to start reading. Then, the bar code sensor 21 reads the bar codes 82a for providing a positional reference of the tabular lines 81 and the bar codes 82b for indicating the instruction code at a step 712, the bar codes for indicating the machine model code of the product at a step 713, and the bar codes 91 for indicating which serial page number of data is read at a step 714, respectively.

Then, the read data from steps 712 to 714 are supplied to the main computer 70 at a step 715 as shown in FIG. 13(e) and the bar code sensor 21 reads the clock codes 92 for indicating which row is read at a step 716. If it is found by the color mark sensor 22 at a step 717 that the read row is marked with colored marks M, the read data of the step 716 is supplied to the main computer 70 at a step 718 as shown in FIG. 13(e). If it is found at a step 719 that all rows have been read, a second form original 80 is placed on the original platform 14 at a step 720 and the print switch 64 is turned ON at a step 721 as shown in FIG. 14(b). The computer 70 transmits only data of marked spots to the copying apparatus in accordance with information obtained through the above-described read processes and thus, an image of the second form original 80 is formed on the photoreceptor drum 1 while the main computer 70 transmits only data of rows provided with marks M to terminals of the copying apparatus, whereby only the transmitted data of the rows of the form original 80 is printed out on the copy paper in the same manner as the printout mode so as to produce a second copy X2.

As shown in FIG. 13(f), the second copy X2 is produced so that only data of rows provided with colored marks M may be overlapped with the second form original 80'. In the case of extract of information, the second copy X2 is used for check at a department of parts control or as an order sheet for ordering parts in accordance with the rate of operation at the factory. When the second form original 80' is used as the order sheet, it should carry a title "Order Sheet38 , a column for quantity to be ordered, etc. which are preliminarily printed. Meanwhile, when the subsequent processing is not performed as in the case of extract of information as described above, printing of the bar code 82b for indicating an instruction for the subsequent processing is not required.

In the case where a subsequent routine processing is performed, the second form original 80' must be provided with the bar code 82b.

Correction of error data will be described as one example of the subsequent processing, hereinbelow. The bar codes 82b of a second form original 80' gives, for example, such an instruction for correcting data of marked spots to data supplied through the keyboard 63. For example, in the case where actual total stocks of some parts are different from the stored data, the second copy X2 is checked at the department in charge and the columns for the error total stocks of the parts are provided with colored marks M1. The second copy X2 provided with marks M1 is placed on the original platform 14 as described above for read and then, correct data are supplied to the copying apparatus through the keyboard 63 at a step 723 as shown in FIG. 14(b).

When the copy X2 is read by the copying apparatus as described above, the marks M1 are read by the color mark sensor 22 and thus, areas of the memory banks 71 of the main computer 70 corresponding to the columns provided with the marks M1 are designated while corrected data fed through the keyboard 63 are written in the designated areas of the memory banks 71 for correction of stored data at a step 724. If it is found at a step 725 that all corrections of stored data have been completed, a third form original 80" is placed on the original platform 14 at a step 726 and the print switch 64 is turned ON at a step 727, whereby the corrected data are supplied from the main computer 70 to the copying apparatus as shown in FIG. 13(g). Thus, the copy X3 having the corrected data on spots marked with marks M1 is obtained at a step 728 followed by a step 729 for end, as shown in FIG. 13(h).

Meanwhile, in the case where a plurality of corrections in the same column are required, corrected data supplied through the keyboard 63 can be divided by the use of a PUNC (punctuation) key 68 shown in FIG. 5 so as to correct a sheet of copy paper by an input at a time. It is to be noted that deletion of data is also possible.

Although parts control has been described by way of example, it is clear that the system of the present invention can be applied to other various jobs which require both human decision and computerized processing sequentially for data processing thereof.

Meanwhile, although in the foregoing description the copying apparatus for use in the system of the present invention is provided with input and output functions for the computer, it is needless to say that the copying apparatus can act as an ordinary one.

It is also to be noted that the overlay in the printout mode as described above need not necessarily be performed so as to produce a copy based only on signals from styluses. In this case, signals applied to styluses are those from the computer or facsimile signals. The overlay may be caused inoperative through overlay of a blank original or by causing the corona charger 2 inoperative or by separation of transfer paper from the photoreceptor drum 1 through a mechanism for moving the transfer roller 4 towards and away from the photoreceptor drum 1 so that the original platform 14, lighting system, drive system of the photoreceptor drum 1 and devices disposed along the circumference of the drum 1 may be turned OFF.

In the above-described embodiment, as shown in FIG. 12, an instruction code is supplied to the copying apparatus through the keyboard 63 only at the step 602 for printout of all designated items and the subsequent processings are arranged to be based on reading, by the bar code sensor 21, of instruction codes which have been preliminarily printed on bar code portions of the form original. Although this method simplifies the operation of the system, it has such a disadvantage that a number of form originals must be prepared. Accordingly, in the case where a great amount of processings are required, the following modifications thereof may be desirably employed.

Figure 15:
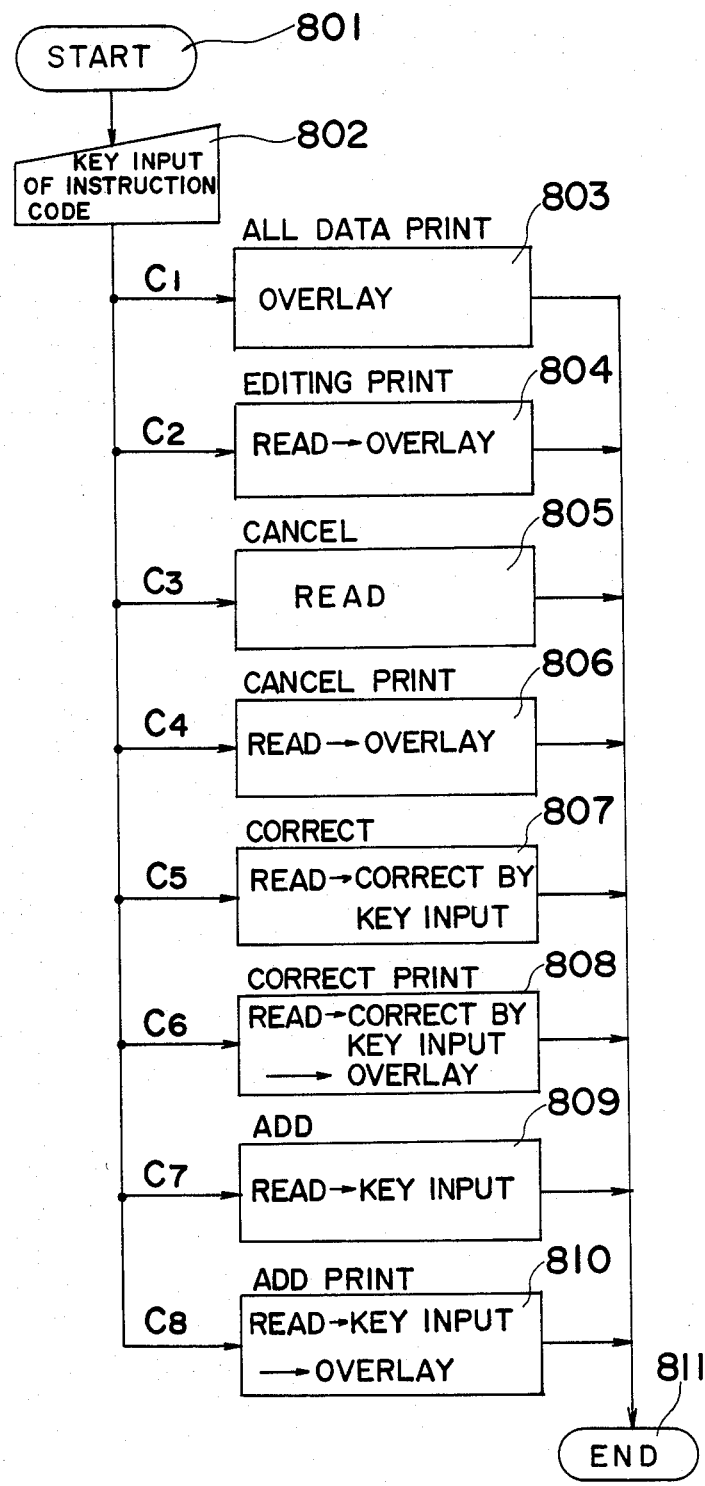
FIGS. 15 to 17 are flow charts similar to FIG. 12, which particularly show modifications thereof, respectively.

In a first modification, all instruction codes are arranged to be supplied to the copying apparatus through the keyboard 63 as shown in FIG. 15. In this case, the form original 80 carries the reference bar codes 82a and tabular lines. Accordingly, referring back to the above-described first embodiment, one form original can act as the first form original and the second form original. The instruction codes supplied to the copying apparatus through keying of the keyboard 63 may be symbolic codes or language codes as shown below.

TABLE 1

| Symbolic code | Language code | Instruction |
| --- | --- | --- |
| C1 | ALL DATA PRINT | Print out all data on designated items. |
| C2 | EDITING PRINT | Read marked data and print out them after editing. |
| C3 | CANCEL | Read marked data and cancel them from memory banks. |
| C4 | CANCEL PRINT | Perform cancellation by C3 and print out corresponding data. |
| C5 | CORRECT | Read marked data and correct them to those supplied through keying. |
| C6 | CORRECT PRINT | Perform correction by C5 and print out corresponding data. |

TABLE 1-continued

| Symbolic code | Language code | Instruction |
| --- | --- | --- |
| C7 | ADD | Read marked data and add data supplied through keying to them. |
| C8 | ADD PRINT | Perform addition by C7 and print out corresponding data. |

In the case where instruction codes are supplied in the form of symbolic codes C1 to C8 through keying, the same display as each language code is made at the display panel 66 and corresponding processing is started in response to turning ON of the start switch 62.

In the case where instruction codes are supplied in the form of language codes through keying, each keyed language code is displayed at the display panel 66 so that the same subsequent processing as the symbolic codes may be performed.

Meanwhile, the flow chart of FIG. 15 is so simple that description of the processing sequence is abbreviated for brevity.

Figure 16:
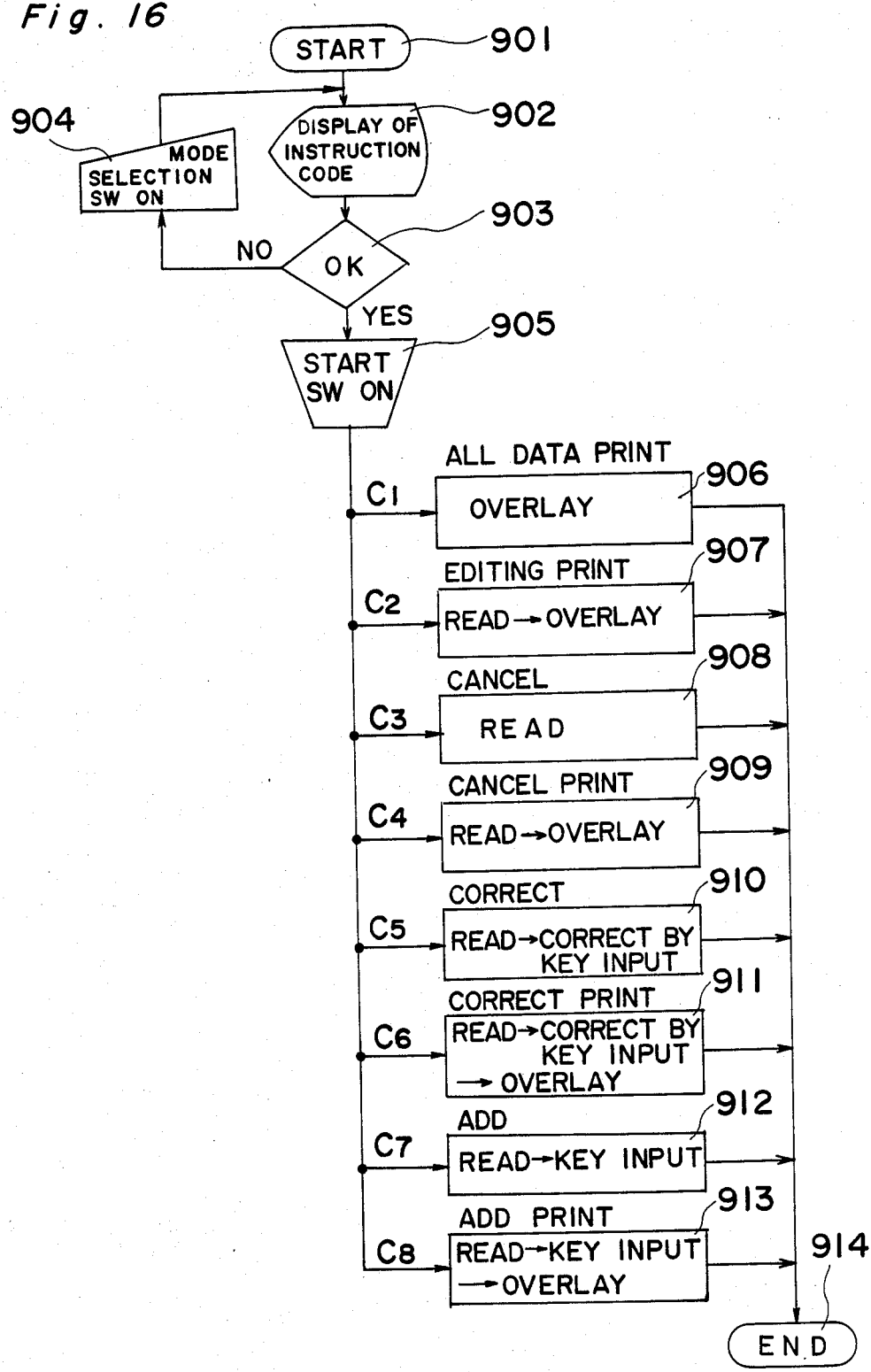

In a second modification, each language code is displayed at the display panel 66 in turns in response to sequential turning ON of a mode selection switch 67 shown in FIG. 5 so as to select a desired mode by stopping turning ON of the mode selection switch 67 when the disired mode is displayed at the display panel 66 as shown in FIG. 16. When the power source is turned ON, the display panel 66 is so arranged as to display "PRINT38 and thus, ordinary printing can be started in response to turning ON of the print switch 64. When the copying apparatus has been connected with the main computer 70 by keying of key words, call through the modem, etc. in this state, the language code corresponding to the symbolic code C1 is displayed at the display panel 66 at a step 902 following a step 901 for start. If it is found at a step 903 that it is a desired mode, corresponding items are supplied by keying and the start switch 62 is turned ON at a step 905. Then, all necessary data are transmitted from the main computer 70 to the copying apparatus and the data are supplied from the needle electrode 40 so as to produce a copy overlapped with the form original at a step 906. If the mode selection switch 67 is depressed in turns when the language code for C1 is displayed at the display panel 66, the language codes for C2 to C8 are sequentially displayed at the display panel 66. If the mode selection switch 67 is depressed when the final language code for C8 is displayed, the language code for C1 is again displayed at the display panel 66. Thus, selection of each mode is performed at a step 904 and corresponding instruction of each of C2 to C8 is selectively executed at steps 907 to 913, respectively.

Figure 17:
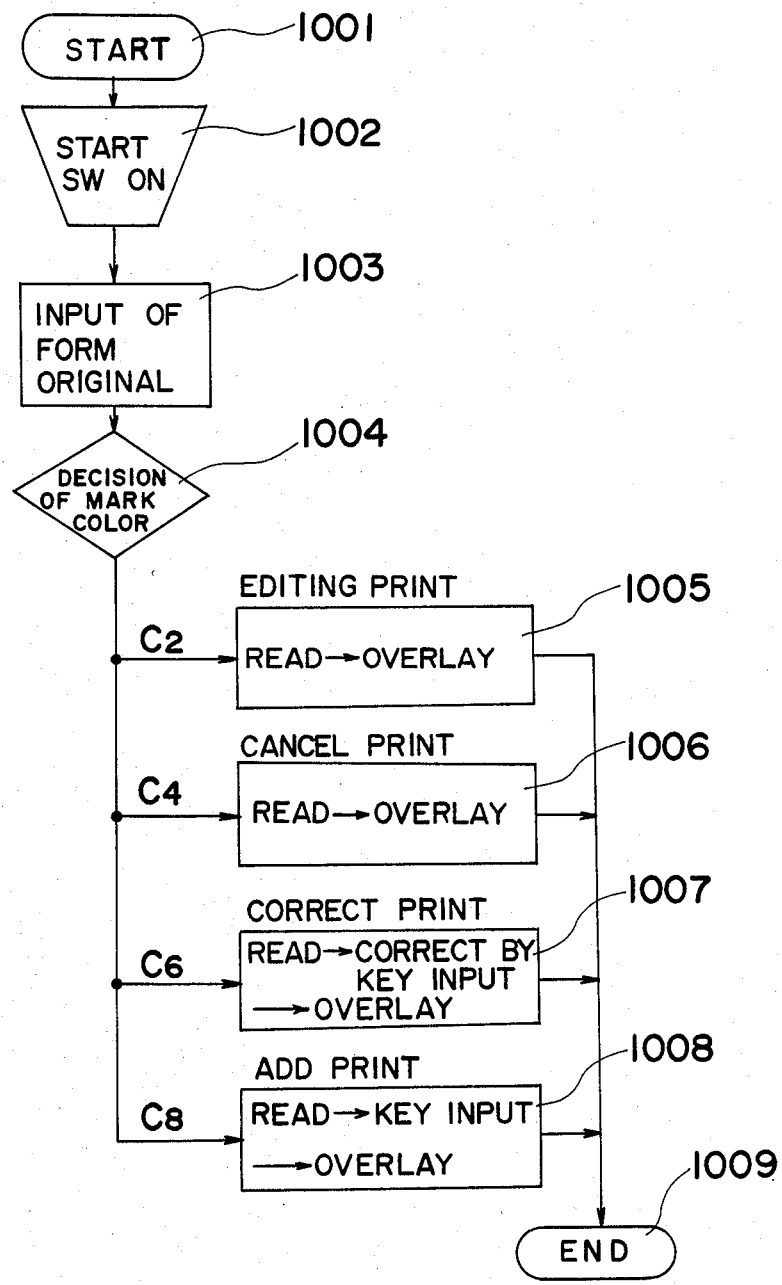

In a third modification, check by a person in charge is performed by changing colors of fluorescent pens in accordance with the subsequent processing so that the colors may be discriminated by color sensors as shown in FIG. 17. As the color sensors, semiconductor color sensors, for example, PD-150 and PD-160 commercially available from Sharp Corp., Japan are used. The semiconductor color sensor includes two photodiodes in one substrate thereof which have different sensitivities to wave lengths of light. Respective output photocurrents of the two photodiodes are transformed logarithmically and are so decreased as to provide output voltages corresponding to wave length of light.

For example, colors pink, blue, green and yellow are allotted to C2, C4, C6 and C8 of Table 1, respectively so that respective processings may be performed in accordance with positions and colors of marked spots.

Meanwhile, the processing of C1 is performed by supplying the instruction code through keying of the keyboard 63 and processings of C3, C5 and C7 are deleted in the third modification. Since the processing sequence FIG. 17 is similar to that of FIG. 16, the description thereof is abbreviated for brevity.

It is to be noted that the needle electrode 40 is used to print out data from the main computer 70 in the above-described embodiments but can be so arranged as to print out data from a handy computer, for example, a pocket computer PC-1211 manufactured by Sharp Corp., Japan. For example, during a negotiation for order of parts, data for designating forms, etc. are supplied to the handy computer in BASIC language and the handy computer is connected with the I/O port of the system of the present invention so as to obtain an order sheet in the designated form. The BASIC language from the handy computer is translated into machine language by a program of the system of the present invention so as to be supplied to the needle electrode 40. When tabular lines are required, overlay with tabular lines of the original is possible in the same manner as above-described embodiments.

Meanwhile, in the case of plain paper copying (PPC), in addition to the above-described needle electrode, a cathode ray tube (CRT), an optical fiber tube (OFT), laser, etc. can be used as output devices of the computer. Except for a case of PPC, the copying method of the present invention can be employed in combination with ink jet.

As is clear from the foregoing description, a computerized information processing system equipped with a copying apparatus of the present invention comprises the steps of imparting to the copying apparatus, functions for recording by forming an image on recording paper in response to an image signal supplied from a computer, reading marks provided on the recording paper, and supplying to the computer, signals corresponding to predetermined processing instructions, besides normal copying function thereof, providing marks at necessary portions of a first image recorded on the recording paper in response to an output from the computer, reading the marks by the use of the copying apparatus and also supplying the processing instructions to the computer so as to operate the copying apparatus and forming a second image obtained through processing by a read signal of the marks and the processing instructions on the recording paper.

Moreover, according to the present invention, an electrophotographic copying apparatus is connected with the computer, and the copying apparatus is so arranged as to print out an image which is read from an original and to supply to the computer, data of codes or marks which are read from the original, while data transmitted from the computer are printed out so as to be overlaid with the original, and marks are provided at specific spots of the original so that data at marked spots may be selected for printout or so that data stored in the computer corresponding to marked spots may be changed.

Accordingly, since desired data can be selected from the computer or the data stored in the computer can be changed only by checking a card in a form for use in ordinary jobs including the original produced by the copying apparatus and by providing marks thereon, information stored in the computer can be selected or changed even by those who have no experience or understanding in operation of computers, whereby data processing has been improved in operational efficiency remarkably due to the simplified operations.

Meanwhile, the present invention has such an advantage that, since forms such as tabular lines of cards, etc. are obtained directly from the original, programming for drawing the forms is not required and optional forms can be employed.

Although the present invention has been fully described by way of example with reference to the accompanying drawings, it is to be noted that various changes and modifications will be apparent to those skilled in the art. Therefore, unless other changes and modifications depart from the scope of the present invention, they should be construed as included therein.

What is claimed is:

1. A computerized information processing system including a copying apparatus and a computer means provided with a memory means for storing image signals, said copying apparatus being capable of composing an image, on a recording paper, of an original sheet placed on said copying apparatus, including also an image based on the image signals from said computer and at least comprising:

a photoreceptor drum;

a charging means for electrically charging a surface of said photoreceptor drum;

a scanning and projecting means for scanning the original sheet and projecting an optical image of the original sheet onto the surface of said photoreceptor drum;

a transport means for transporting a recording paper;

a transfer means for transferring to the recording paper, an image formed on said photoreceptor drum;

an image forming means for forming a visible image on the recording paper in response to the image signals supplied from said computer;

a mark read means for reading optical marks provided on the original sheet and converting the optical marks into electrical signals;

a signal output means for supplying to said computer, the electrical signals as instruction signals thereto;

said computer means being for at least supplying the image signals to said image forming means of said copying apparatus and executing, in response to the instruction signals supplied from said copying apparatus, a predetermined processing of the image signals stored in said memory means; and said copying apparatus being operatively associated with said computer means in such a manner that, when said copying apparatus forms a composite image on the recording paper by composing a scanned and projected image of the original sheet provided with the optical marks corresponding to predetermined processing instructions to said computer and an image based on a primary image signal supplied from said computer, it thereafter reads, by the use of a read means of said copying apparatus, optical marks on the recording paper having the composite image formed thereon and then, supplies the instruction signals to said computer means, said computer means producing a secondary set of image signals after executing, in response to the instruction signals, the predetermined processing of the primary image signals and making an output of the secondary image signals at the time of a subsequent copying operation.

2. A computerized information processing system as claimed in claim 1, wherein said read means includes a first read means for reading the optical marks provided on the original sheet and a second read means for reading the marks provided on the composite image.

3. A computerized information processing system as claimed in claim 2, wherein said second read means is so provided as to be adjusted in position and said copying apparatus further includes means for detecting a position of said second read means.

4. A computerized information processing system as claimed in claim 1, wherein at least said scanning and projecting means and an exposure lamp for irradiating the original are operated during the read operation of the marks and a reflecting mirror is so provided in a light path for projection as to direct projected light towards a photo detector for reading the marks.

5. A computerized information processing system as claimed in claim 1, wherein the marks provided on the composite image are classified by colors corresponding to the processing instructions and the colors are discriminated during the read of the marks so as to supply to the computer the processing instructions in accordance with information on the discriminated colors.

6. A computerized information processing system including a copying apparatus and a computer means provided with a memory means for storing data representing character signals and their arrangement, said copying apparatus being capable of composing an image, on a recording paper, of an original sheet and an image based on image signals based upon the data from said computer and at least comprising:
- a photoreceptor drum;
- a charging means for electrically charging a surface of said photoreceptor drum;
- a scanning and projecting means for scanning the original sheet and projecting an optical image of the original sheet onto the surface of said photoreceptor drum;
- a transport means for transporting a recording paper;
- a transfer means for transferring to the recording paper, an image formed on said photoreceptor drum;
- an image forming means for forming a visible image on the recording paper in response to the image signals supplied from said computer means;
- a mark read means for reading optical marks provided on the original sheet and converting the optical marks into electrical signals;
- a signal output means for supplying to said computer means, the electrical signals as instruction signals thereto;

said computer means being at least for supplying the data representing character signals and their arrangement to said image forming means of said copying apparatus and executing, in response to the instruction signals supplied from said copying apparatus, a predetermined processing of the data representing character signals and their arrangement stored in said memory means; and said copying apparatus being operatively associated with said computer means in such a manner that, when said copying apparatus forms a composite image on the recording paper by composing a scanned and projected image of the original sheet provided with the optical marks corresponding to predetermined processing instructions to said computer and an image based on a primary image signal supplied from said computer, it thereafter reads, by the use of a read means of said copying apparatus, optical marks on the recording paper having the composite image formed thereon and then, supplies the instruction signals to said computer means, said computer means proucing secondary image signals after executing, in response to the instruction signals, the predetermined processing of the primary image signal and making an output of the secondary image signals at the time of a subsequent copying operation.

7. A computerized information processing system as claimed in claim 6, wherein said read means includes a first read means for reading the optical marks provided on the original sheet and a second read means for reading the marks provided on the composite image.

8. A computerized information processing system as claimed in claim 7, wherein said second read means is so provided as to be adjusted in position and said copying apparatus further includes means for detecting a position of said second read means.

9. A computerized information processing system as claimed in claim 6, wherein at least said scanning and projecting means and an exposure lamp for irradiating the original are operated during the read operation of the marks and a reflecting mirror is so provided in a light path for projection as to direct projected light towards a photo detector for reading the marks.

10. A computerized information processing system as claimed in claim 6, wherein the marks provided on the composite image are classified by colors corresponding to the processing instructions and the colors are discriminated during the read of the marks so as to supply to the computer the processing instructions in accordance with information on the discriminated colors.

* * * * *